United States Patent [19]

Downing et al.

[11] Patent Number: 4,706,992

[45] Date of Patent: Nov. 17, 1987

[54] SEAT BELT

[76] Inventors: Deborah L. Downing; Nicholas P. Carnegis, both of Rte. 3, 447-B, Rosharon, Tex. 77583

[21] Appl. No.: 815,511

[22] Filed: Jan. 2, 1986

[51] Int. Cl.⁴ ................. B60R 22/02; A44B 21/00
[52] U.S. Cl. ............................. 280/801; 297/468; 24/193
[58] Field of Search ............ 297/473, 464, 468, 485; 280/801; 2/314; 24/170, 182, 184, 573, 193

[56] References Cited

U.S. PATENT DOCUMENTS

| | | | |
|---|---|---|---|
| 579,818 | 3/1897 | Cooley | 297/485 |
| 725,563 | 4/1903 | Hine | 2/314 |
| 1,712,198 | 5/1929 | Clapp | 297/473 |
| 1,803,786 | 5/1931 | Andrew | 2/314 |
| 2,288,692 | 7/1942 | Fearson | 297/473 |
| 2,732,604 | 1/1956 | Keltie | 24/193 |
| 2,888,063 | 5/1959 | Rose | 297/473 |
| 3,220,197 | 11/1965 | Christiansen | 24/193 |
| 3,321,247 | 5/1967 | Dillender | 297/473 |

FOREIGN PATENT DOCUMENTS 2067893 8/1981 United Kingdom ............... 297/464

Primary Examiner—David M. Mitchell
Assistant Examiner—Karin L. Ferriter
Attorney, Agent, or Firm—Mark G. Bocchetti; Bernard A. Reiter

[57] ABSTRACT

An improved seat belt to be coupled to and used in conjunction with the existing seat belt in an automobile or other motor vehicle. The connecting means is attachable to and detachable from the strap of an existing seat belt. The pivotable movement of the connecting means is enabled through the use of a base plate having a belt plate pivotably connected thereto. The base plate contains a slot means for affixation to the existing seat belt in the automobile. The belt plate includes a slot means for connection to the supplemental seat belt. The pivotable connecting means allows the wearer of the improved seat belt greater versatility and freedom of movement while maintaining full safety and restraint. Particularly, the wearer of the improved seat belt will not be restrained from rotational movement such that the wearer may rest horizontally on the seat.

6 Claims, 8 Drawing Figures

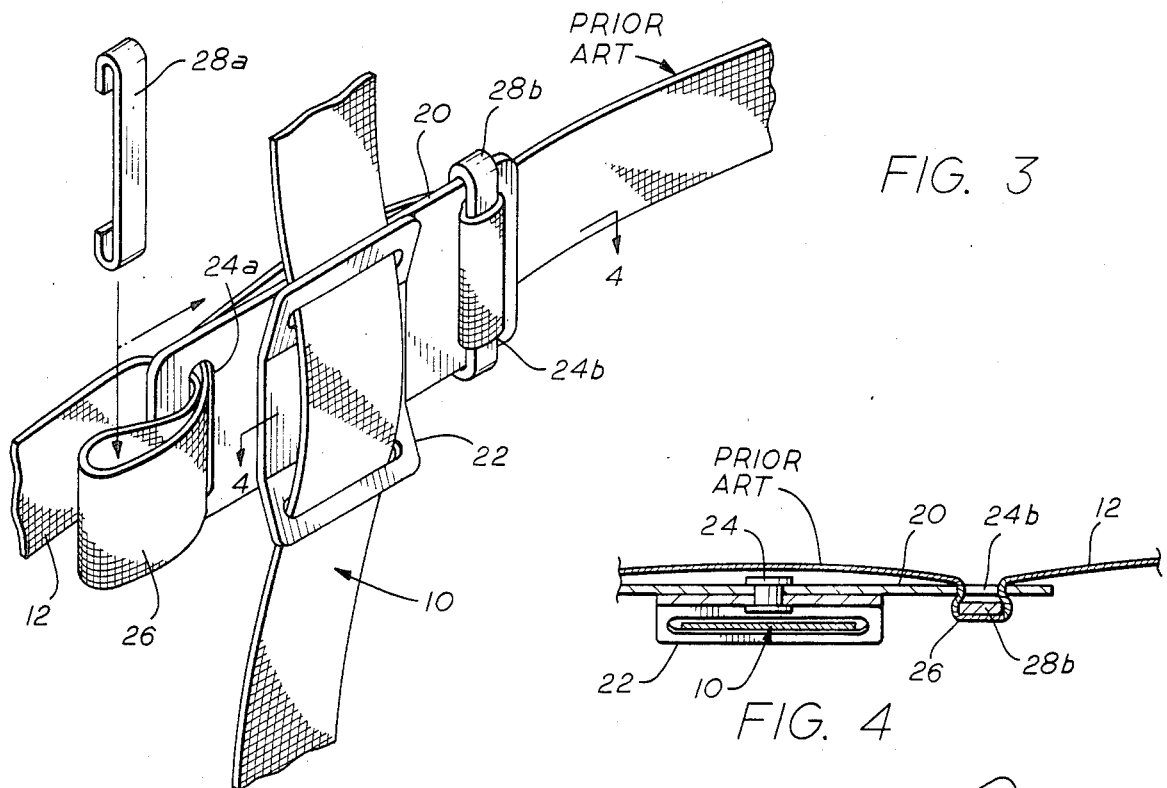
FIG. 3
FIG. 4
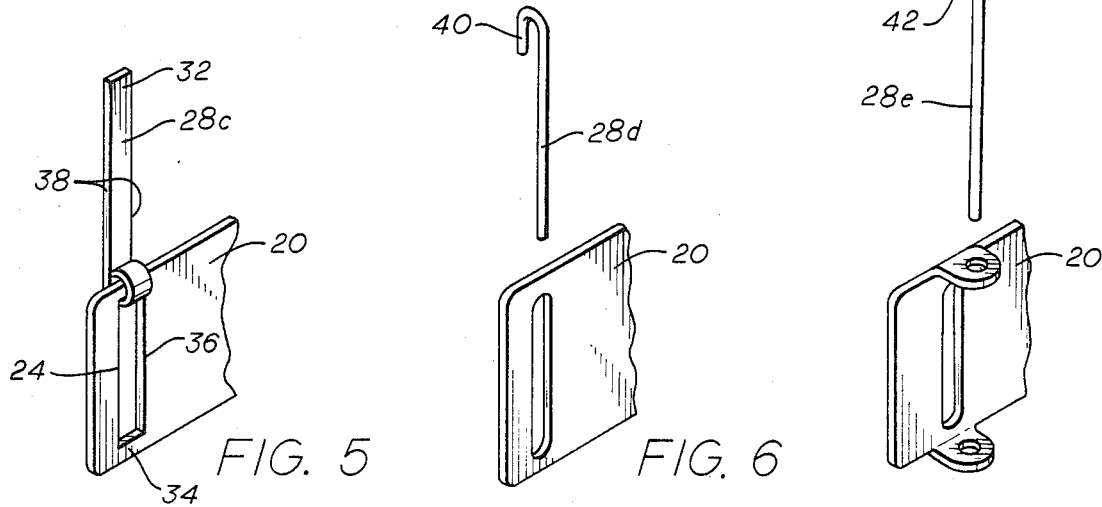
FIG. 5
FIG. 6
FIG. 7
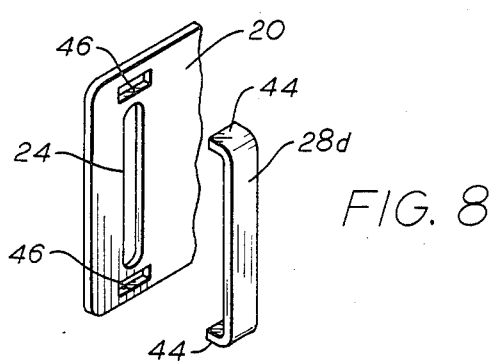
FIG. 8

SEAT BELT

BACKGROUND OF THE INVENTION

Field of the Invention

Conventional seat belts which are permanently anchored to the structure of the vehicle are standard requirements under the law in the United States. Such standard anchorages insure proper and effective occupant restraint and are so designed to reduce, if not eliminate, likelihood of their failure. This standard belt and anchorage is applicable, in the United States, to passenger cars, multi-purpose passenger vehicles, trucks and buses. Such seat belt anchorages are installed for each forward-facing passenger. Except for sidefacing seats, seat belt anchorages are generally required to withstand as much as five thousand (5,000) pounds force, in the pelvic area, when tested. Naturally of course the belt, and buckle portion, must be of concomitant strength. Reference may be made Title 49, U.S.C. §571 et al. for a description of the criterion for acceptable belt structure.

Despite the existence of stringent federal regulations proscribing specific requirements for the installation and strength characteristics of seat belts there exists a variety of disadvantages and personal discomforts in the operational use of these devices. Such disadvantages and uncomfortable characteristics are endured by users because of the offsetting safety advantages that are clearly present when the belts are worn.

A principle characteristic of prior art belts contributing to their general discomfort is an inability by the user to move from any position other than upright. In some instances of the prior art, there is an ability by the wearer to move vertically within the belt, such as for example, in U.S. Pat. No. 3,321,247. An ability to move in lateral fashion exists in U.S. Pat. No. 1,712,198 but such design is incapable of compliance with present day federal requirements. Moreover, such device is clearly incapable of protecting a passenger in a head on collision. Other such devices as are shown in U.S. Pat. No. 2,888,063 disclose seat belt, or the like, attachments, adapted to facilitate movement of the wearer thereof but which are either so structurally inferior as to preclude compliance with federal safety belt requirements and/or which do not enable free lateral movement of the wearer without distortion of the seat belt itself from its normal operational condition.

SUMMARY OF THE INVENTION

The present invention is directed to a new and improved seat belt attachment enabling pivotal movement, at the waist, by the wearer.

Another feature and advantage of the invention resides in a seat belt attachment enabling pivotal movement by the wearer and which can easily be coupled to a preexisting seat belt.

A further feature and advantage of the invention resides in a seat belt attachment enabling pivotal movement of the wearer and which can be easily installed or removed without tools.

And yet another feature and advantage of the invention resides in a seat belt attachment enabling pivotal movement of the wearer and which can be installed wthout modification to the existing seat belt structure.

A further feature and advantage of the invention resides in a seat belt attachment enabling pivotal movement by the wearer and which maintains the physical strength and integrity of the initial belt and the anchorage thereof.

A further feature and advantage of the invention resides in a seat belt attachment which allows the wearer thereof to lie down on the seat of the vehicle while maintaining the same degree of safety which was experienced in the upright position.

These and numerous other features and advantages of the invention will be more clearly understood upon a careful examination of the following detailed description, claims and drawings wherein like numerals, denote like parts in the several views and wherein:

DETAILED DESCRIPTION OF THE DRAWINGS

FIG. 3 is an isometric view showing an installation stage of the seat belt attachment of FIG. 2.

FIG. 4 is a cross sectional view of FIG. 3 along the plane 4—4 thereof.

FIG. 5 is an alternative form of the seat belt attachment or keeper means.

FIG. 6 is another form of seat belt attachment or keeper means.

FIG. 7 is yet another form of seat belt attachment or keeper means.

FIG. 8 is yet another form of seat belt attachment or keeper means.

DETAILED DESCRIPTION OF THE INVENTION

Figure 1:
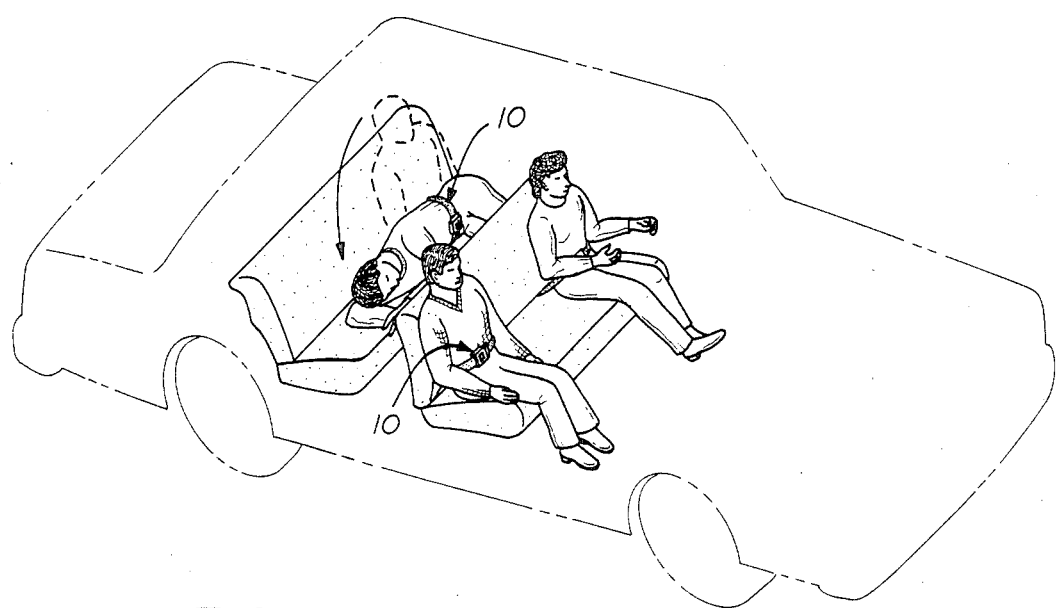
FIG. 1 is a cut away view of an automobile showing a passenger therein wearing the seat belt attachment of the invention so as to enable the passenger to ride in a reclined position.

With reference now to FIG. 1 there is shown an automobile with passengers in the front and back seat thereof. All of the passengers shown are wearing their seat belts, each having the attachment of the invention coupled thereto. The passenger in the back seat is shown in a reclining position while the passengers in the front seat are shown in erect position. Each of the seat belt attachments 10 are adapted to be coupled to the conventional seat belt, known and referred to herein as the prior art, see FIG. 2. The prior art comprises a pair of belts 12, 14, each securely anchored to the structure of the vehicle and which are adapted to be coupled to one another through the use of the well known tongue 16 and snap buckle 18, each of which are respectively attached to the belt ends 12, 14. The snap buckle 18 is connected to belt end 14 in the well known sliding fashion while the tongue 16 is connected to belt end 12 through the use of the folded over portion 12a of the belt end which is disposed through the slot 16a of the belt, in well known manner.

Figure 2:
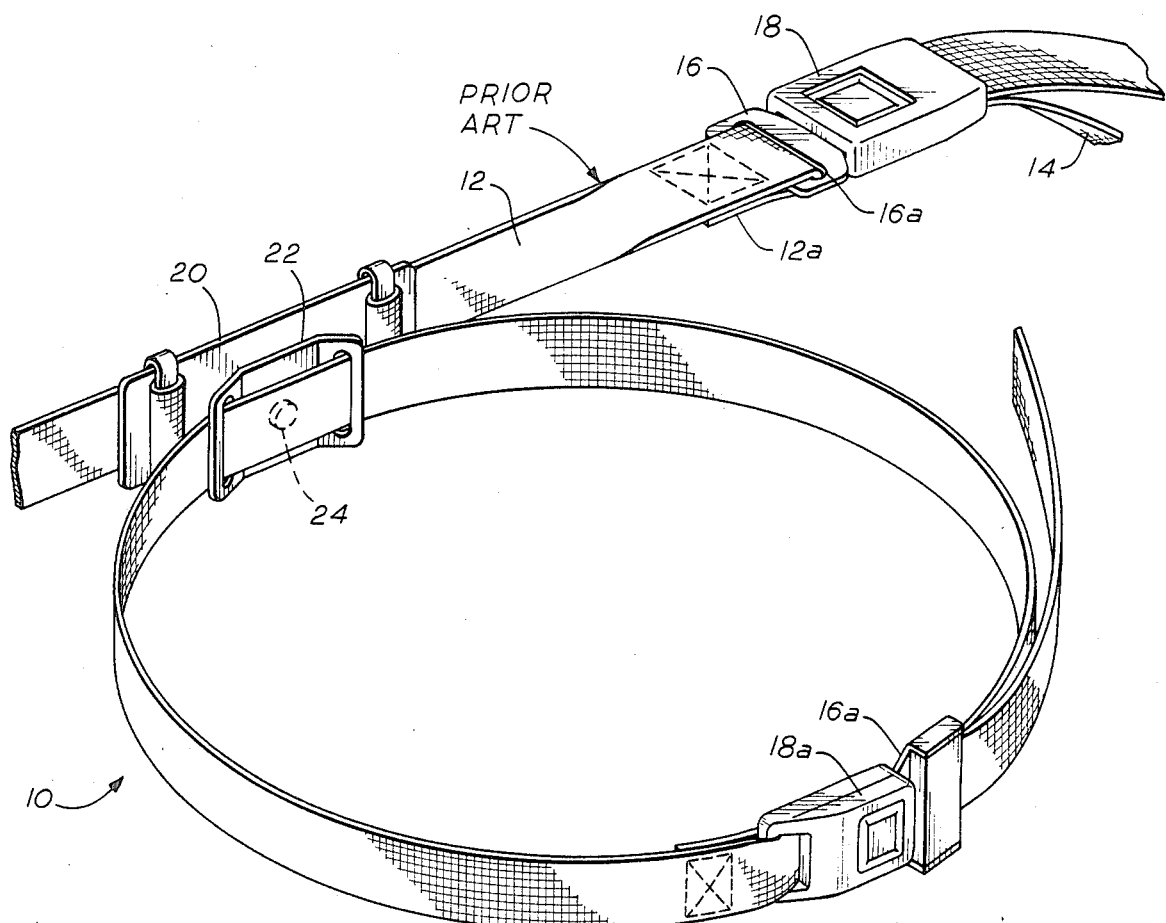
FIG. 2 is an isometric view showing the seat belt attachments of the invention.

The attachment 10 of the invention comprises a base plate 20 to which there is affixed the belt plate 22, as best shown in FIGS. 2 and 3. The plates are integrally connected to one another by a connecting pivot means 24 and which may constitute a heavy duty rivet connection, screw and bolt, or the like so long as the belt plate 22 is connected to the base plate 20 in pivotal fashion by means of the connecting pivot means 24.

The base plate 20 and belt plate 22 are advisably constructed of steel or other high strength material sufficient to comply with federal requirements for strength and durability. Likewise, the connected pivot means 24 is to be constructed of sufficient diameter and strength to comply with regulatory standards pertaining to products of this type.

The base plate 20 is generally characterized by an elongate configuration which, in width, is slightly greater than that of the belt 12 which is coupled thereto in a manner described hereinafter. The length of the base plate 20 is sufficient to enable a looping insertion of the belt 12 at each end thereof, see for example FIG. 3 wherein the belt 12 is inserted into the elongate slot 24a in the base plate 20. As shown in FIG. 3, the attachment 10 of the invention is affixed to the belt 12 merely by manually inserting a double thickness looped portion 26 of the belt 12 into the elongate slot 24a of the base plate 20. Thereafter, a keeper means 28a is inserted through the loop 26 so that the loop 26 may not be pulled back out through the elongate slot 24a plate 20. It is therefore readily visualized that by pulling the belt 12 tightly against the keeper means 28a there will occur a self-locking coupling of the attachment 10 to the belt 12 that substantially physically precludes separation of each from the other, see FIG. 4.

As best shown in the sectional view of FIG. 4, the keeper means 28a is not physically capable of being pulled through the elongate slot 24a and in this manner, the belt loop 26 becomes integrally coupled with the base plate 20 and hence the attachment 10 of the invention. As more clearly shown in FIG. 3, the elongate slot 24b of base plate 20 is occupied by the looped belt 26 and wherein the keeper means 28b is disposed on that side of the plate 20 opposite from that which the belt loop 26 was inserted. The keeper means 28b thus is pulled taut against the side of the plate 20 by the belt 12 and the loop portion 26 to thereby retain the attachment 10 in locking relation to the belt 12. The same locking relation between the belt loop 26 and elongate slot 24a occurs upon insertion of the keeper means 28a into the loop section of the belt 12. It is thus readily observed that the locking relation of attachment means 10 to belt 12 occurs on each side of the connecting pivot means 24 through the use of the keeper means 28a, 28b.

In FIGS. 5-8 is shown a plurality of alternate keeper means 28 that may be used in lieu of the keeper means 28a, 28b shown in FIGS. 2-4, though it will be recognized that the configuration of such keepers may be a simple straight pin without a hook. Such design however is not as reliable as the hooked design herein. In FIG. 5 for example is shown a keeper means 28c hingedly connected to plate 20 and which is adapted to extend, at its lower end, below the lower end of elongate slot 24 so that the end 32 of keeper means 28c comes into resting relationship against wall portion 34 of base plate 20. Likewise, it will be recognized that the elongate sides 38 of keeper means 28c may be of sufficient width to abut the wall 36 of base plate 20. In the alternative, both the keeper portions 32, 38, or either of them, may abut the respective wall portions 36, 34 of base plate 20.

In FIG. 6 for example there is shown simply a keeper means 28d having a hooking section 40 and wherein the elongate keeper means 28d is adapted to slip into belt loop 26 while hook section 40 rests over the elongate side wall of base plate 20.

In FIG. 7 there is shown the keeper means 28e having a simple angular hook 42 adapted to rest on the elongate wall of base plate 20. It will be recognized that the hook sections 40, 42 of the keeper means shown exist primarily to ensure against accidental slippage of the keeper means 28 through the loop 26. It is found in practice however that once the belt is pulled taut against the keeper means (see FIGS. 3 and 4, keeper means 28b), the possibility of accidental loss of the keeper means 28 is substantialy precluded.

In FIG. 8 there is shown yet another form of keeper means 28d characterized by right angle ends 44 adapted to be inserted and rest in openings 46 above and below elongate slot 24.

In operation of the attachment means of the invention, all of the benefits therefrom are acquired by merely placing the seat belt attachment 10 and its base plate 20 in abutting and substantially parallel relation to the belt 12. Thereafter, a portion of the belt 12 is grasped in a looping fashion which is inserted into the elongate slot 24a. Thereafter, a keeper means 28 is inserted into the loop and the belt is pulled taut so that the keeper means is pulled up against the base plate 20. Then another section of belt 12 is grasped in loop fashion which is inserted through elongate slot 24b and a keeper means 28 is inserted through the loop. The loop is then pulled taut so as to bring the keeper means into abutting relation to the base plate 20. In this manner, the belt attachment 10 is coupled in locking relation to the pre-existing anchored seat belt of the vehicle and it becomes an integral portion thereof. The user simply places the attachment around him and, using the conventional snap buckle and tongue (FIG. 2) secures himself (herself) into the seat in the same manner that such user would deploy the belt around his torso were he using the preexisting tongue and buckle (16, 18) as shown in FIG. 2. Thus it will be recognized that the tongue 16a and buckle 18a used in connection with the attachment 10 of the invention are the same as that which is conventionally used in automobile and other vehicles. However, with the attachment of the invention the user may lie down in a resting position on the seat (FIG. 1) or on the arm rest (FIG. 1) without concern or diminution of his security and safety.

In implementing the invention hereof it will be recognized that various modifications and changes may be made without departing from the spirit and scope hereof. For example numerous other types of keeper means may be designed for retaining the belt and coupling it to the attachment 10 while yet fulfilling the object of enabling pivotal movement of the user without diminution of his safety and security in relation to the safety and security which such user would otherwise have were he (she) wearing the seat belt constituting the original equipment in the vehicle.

Therefore that which is claimed and desired to be secured by United States Letters Patent is:

1. A seat belt attachment device for connecting a supplemental seat belt with a preexisting vehicle seat belt comprising:
a base plate having a belt plate affixed by pivotal connection thereto;
a supplemental seat belt affixed to said belt plate for encircling the torso of a user and thereby enabling movement by the user about said pivotal connection;
said base plate having a slot means therein for receiving a looped portion of the preexisting seat belt anchored to the vehicle, and
keeper means for insertion through said looped portion for precluding separation of the preexisting seat belt from said base plate.

2. A seat belt attachment device for connecting a supplemental seat belt with a preexisting vehicle seat belt as recited in claim 1, wherein said slot means constitutes first and second slots on opposite sides of said pivot connection so as to evenly distribute forces on both sides thereof and to facilitate pivotal movement.

3. A seat belt attachment device for connecting a supplemental seat belt with a preexisting vehicle seat belt as recited in claim 1, wherein said keeper means is configured to rest on an edge of said base plate.

4. A seat belt attachment device for connecting a supplemental seat belt with a pre-existing vehicle seat belt as recited in claim 1 wherein said belt plate has a slot therein through which said supplemental seat belt resides.

5. A seat belt attachment device for connecting a supplemental seat belt with a preexisting vehicle seat belt as recited in claim 1, including a looped portion of a preexisting seat belt of a vehicle disposed in said slot means with said keeper means disposed in said loop.

6. A seat belt attachment device for connecting a supplemental seat belt with a preexisting automobile seat belt comprising:
  a base plate;
  a belt plate pivotably affixed to said base plate;
  slot means located in said base plate for receiving a looped portion of the preexisting automobile seat belt;
  keeper means inserted through said looped portion for affixing the preexisting automobile seat belt to said base plate;
  a supplemental seat belt having two ends, said supplemental seat belt being attached to said belt plate between said two ends;
  releasable buckling means affixed to each end of said supplemental seat belt.

* * * * *